United States Patent
Stohr

(10) Patent No.: US 9,886,635 B2
(45) Date of Patent: Feb. 6, 2018

(54) SYSTEM AND METHOD FOR DETECTING A REGION OF INTEREST ABOUT TILTED LINE

(71) Applicant: MANDO CORPORATION, Gyeonggi-do (KR)

(72) Inventor: Alexander Stohr, Frankfurt am Main (DE)

(73) Assignee: MANDO CORPORATION, Gyeonggi-Do (KR)

( * ) Notice: Subject to any disclaimer, the term of this patent is extended or adjusted under 35 U.S.C. 154(b) by 34 days.

(21) Appl. No.: 15/088,098

(22) Filed: Mar. 31, 2016

(65) Prior Publication Data

US 2016/0321508 A1    Nov. 3, 2016

(30) Foreign Application Priority Data

Apr. 29, 2015   (DE) ................ 10 2015 207 896

(51) Int. Cl.
| | |
|---|---|
| *G06K 9/46* | (2006.01) |
| *G06K 9/00* | (2006.01) |
| *G06K 9/32* | (2006.01) |
| *G06K 9/62* | (2006.01) |

(52) U.S. Cl.
CPC ....... *G06K 9/00798* (2013.01); *G06K 9/3233* (2013.01); *G06K 9/4604* (2013.01); *G06K 9/6203* (2013.01)

(58) Field of Classification Search
CPC . G06K 9/00798; G06K 9/3233; G06K 9/6203
See application file for complete search history.

(56) References Cited

U.S. PATENT DOCUMENTS

| | | | |
|---|---|---|---|
| 2007/0154202 A1 | 7/2007 | Lee et al. | |
| 2008/0273750 A1* | 11/2008 | Fujimoto | G06K 9/00362 382/103 |

FOREIGN PATENT DOCUMENTS

| | | |
|---|---|---|
| JP | 2011-128844 | 6/2011 |
| KR | 10-1310680 | 9/2013 |

(Continued)

OTHER PUBLICATIONS

D.J. Dailey and F.W. Cathey, "The Automated Use of Un-calibrated CCTV Cameras as Quantitative Speed Sensors", Jan. 2006, Phase 3, Washington State Transportation Center—Final Technical Report Agreement T2695, Task 55.*

(Continued)

*Primary Examiner* — Siamak Harandi
(74) *Attorney, Agent, or Firm* — Ladas & Parry, LLP

(57) ABSTRACT

The present invention relates to a system for detecting a region of interest about a tilted line including: an image acquisition unit configured to acquire a front image by photographing a front of a vehicle; an image processing unit configured to divide the front image in a pixel unit of a row and a column and shift the front image by one pixel in a left or right direction in each row or in an upper or lower direction in each column until a region of interest (ROI) appears in a straight line in one direction; and a control unit configured to calculate coordinate values of the pixels forming the straight line in one direction to determine the tilted line of the region of interest, when the straight line in one direction appears in the region of interest as the shifted result.

9 Claims, 9 Drawing Sheets

(56) References Cited

FOREIGN PATENT DOCUMENTS

| KR | 10-2013-0120041 | 11/2013 |
|---|---|---|
| KR | 10-2013-0128162 | 11/2013 |

OTHER PUBLICATIONS

Office Action dated Feb. 20, 2017 for Korean Patent Application No. 10-2016-0052772 and its English translation by Global Dossier.
Office Action dated Feb. 19, 2016 for German Patent Application No. 10 2015 207 896.5 and its English machine translation by Google Translate.
Notice of Allowance dated Aug. 25, 2017 for Korean Patent Application No. 10-2016-0052772 and its English translation provided by Applicant's foreign council.

* cited by examiner

[FIG. 1]
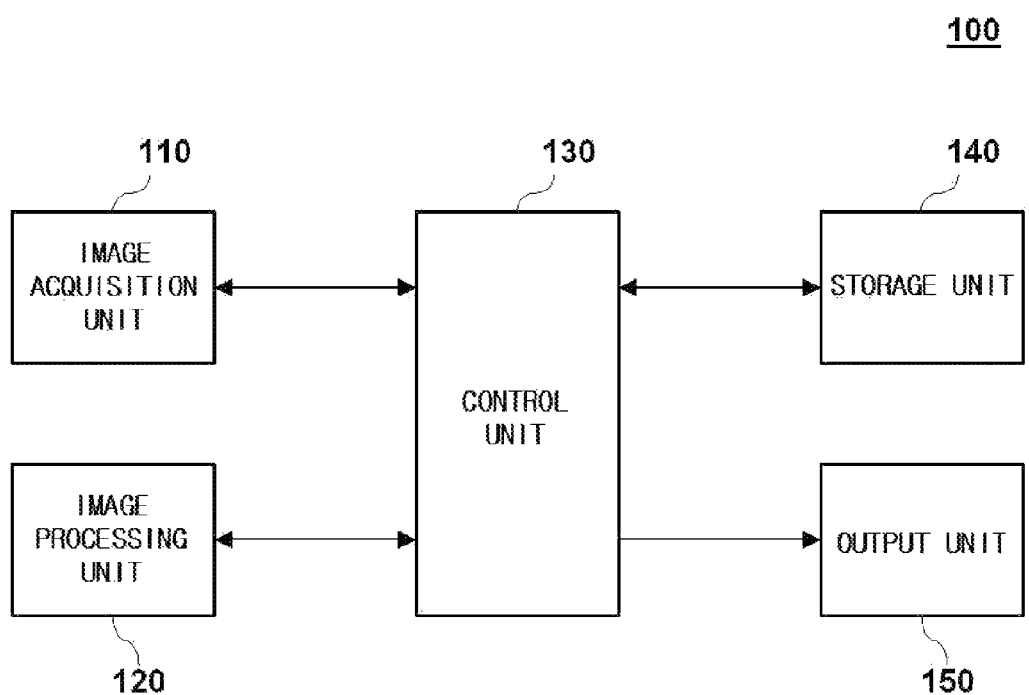

[FIG. 2]
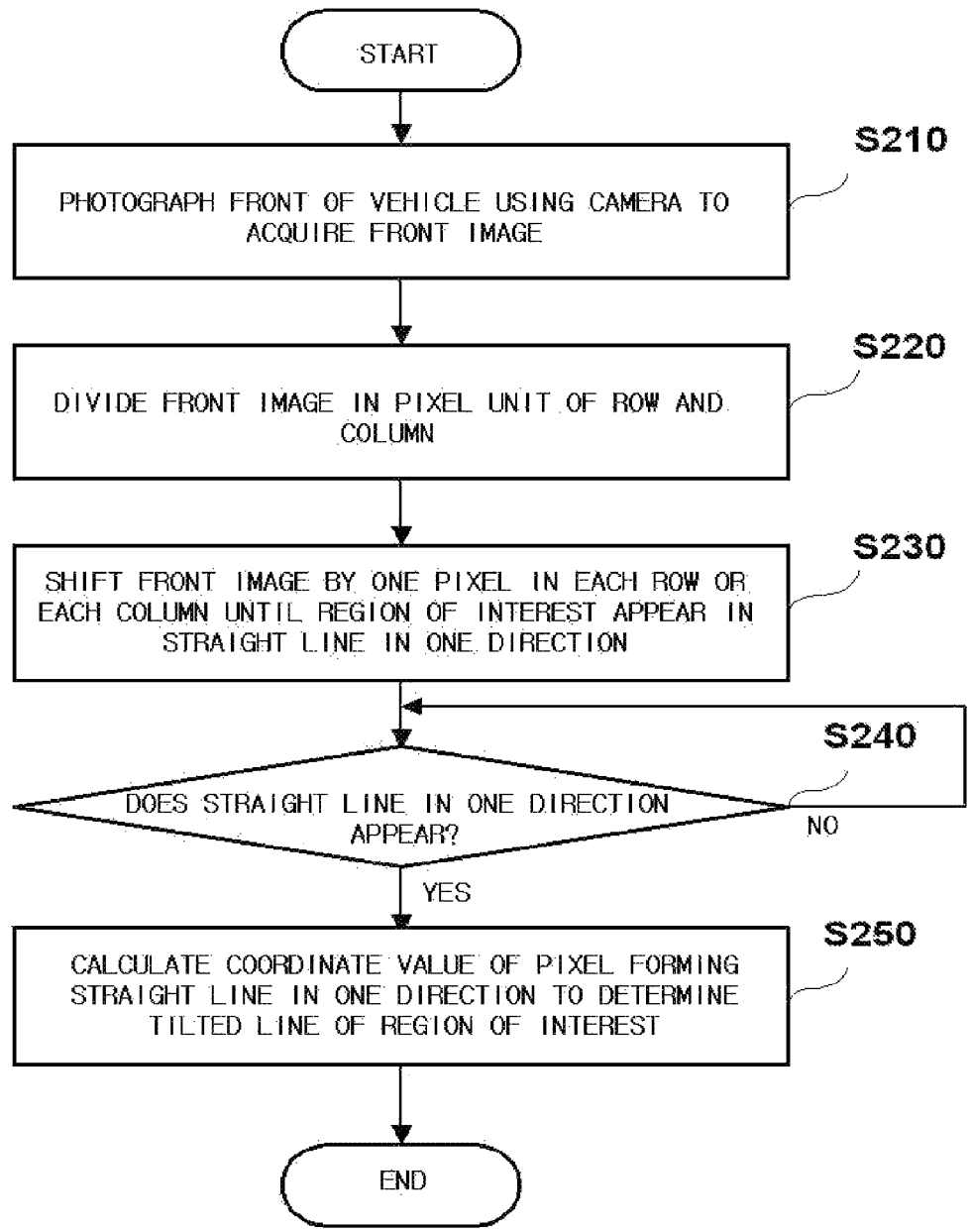

[FIG. 3]
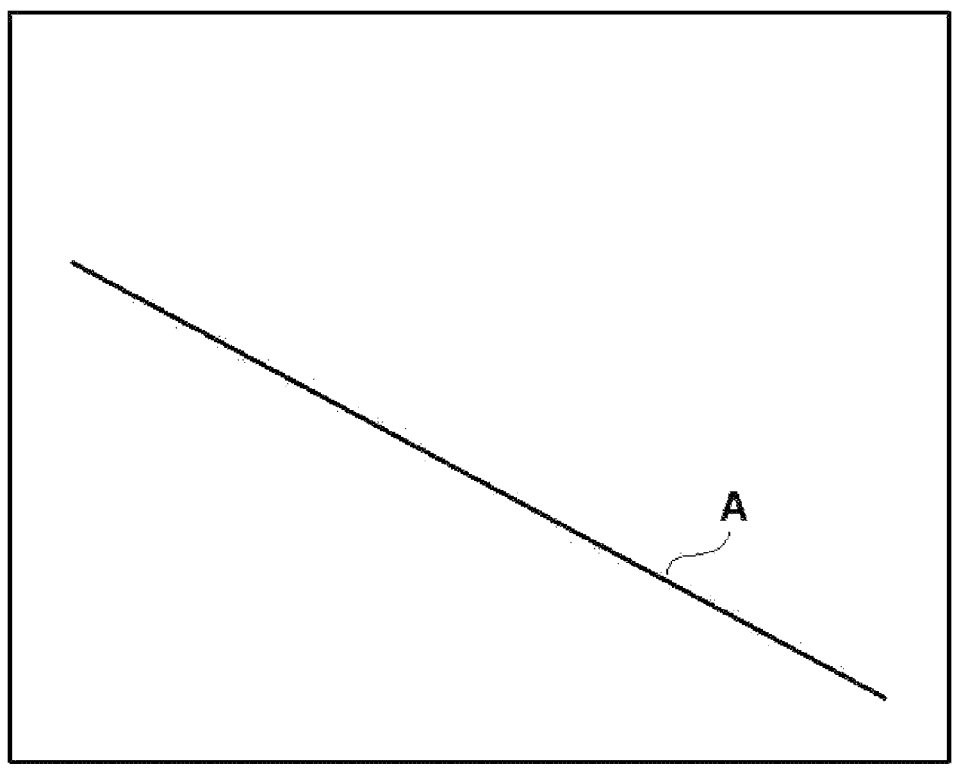

[FIG. 4]
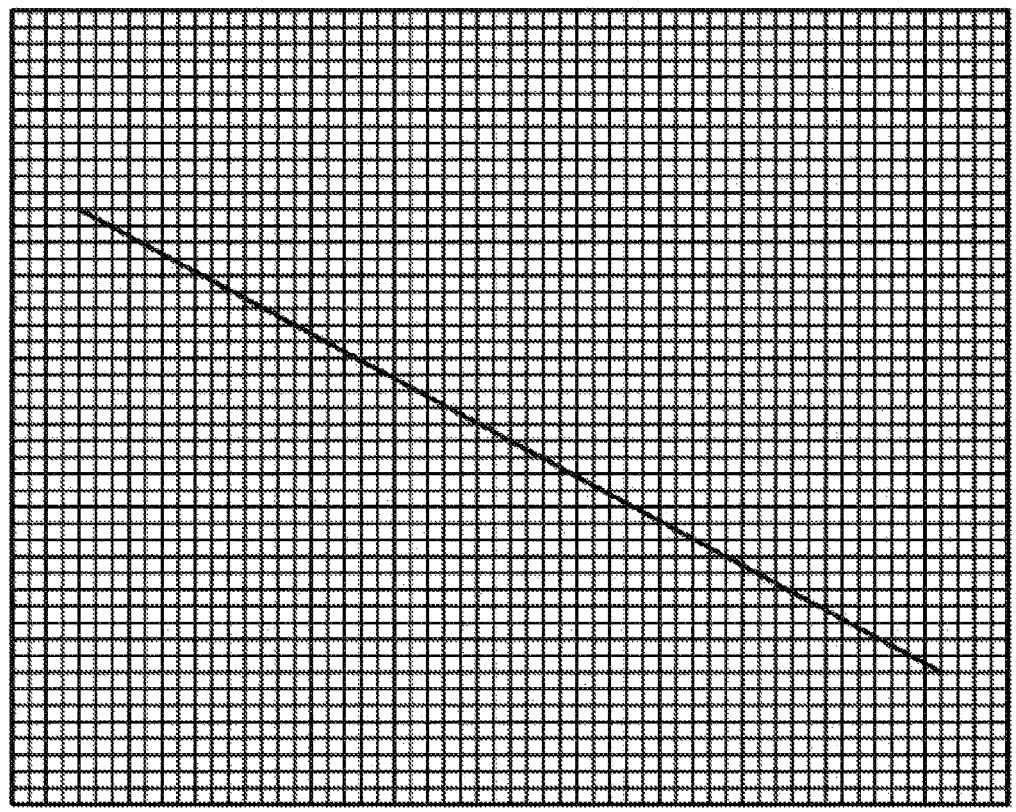

[FIG. 5]
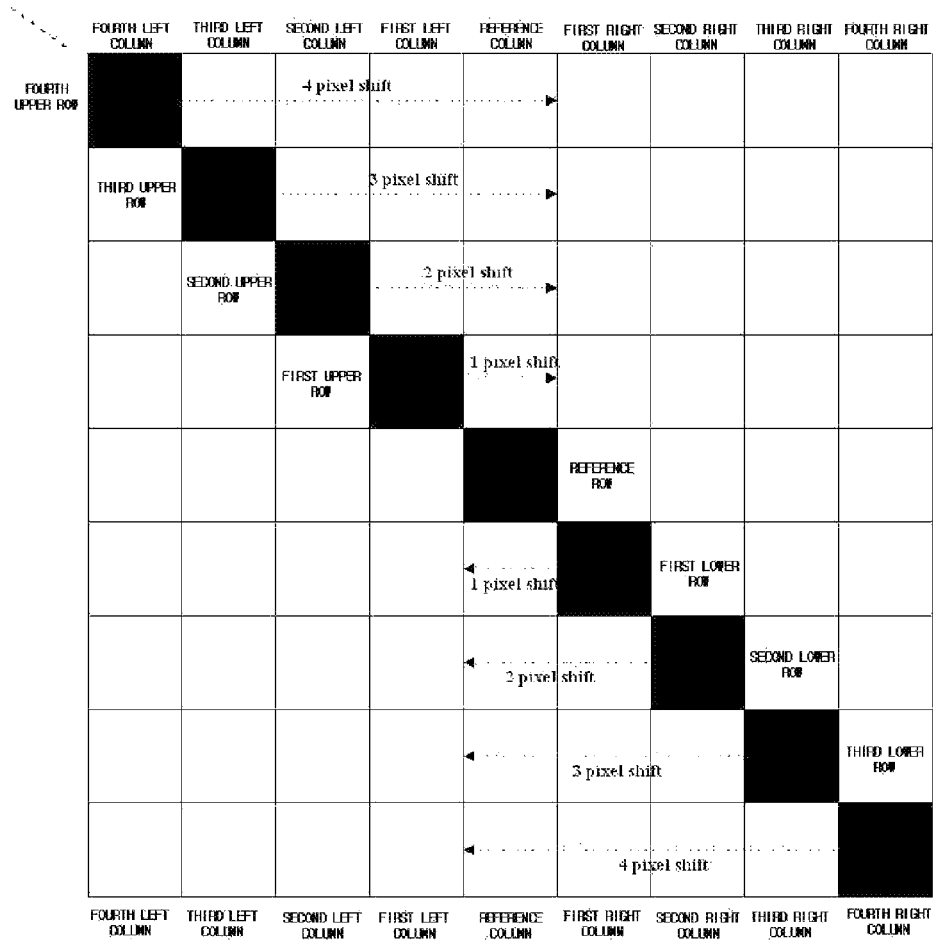

[FIG. 6]
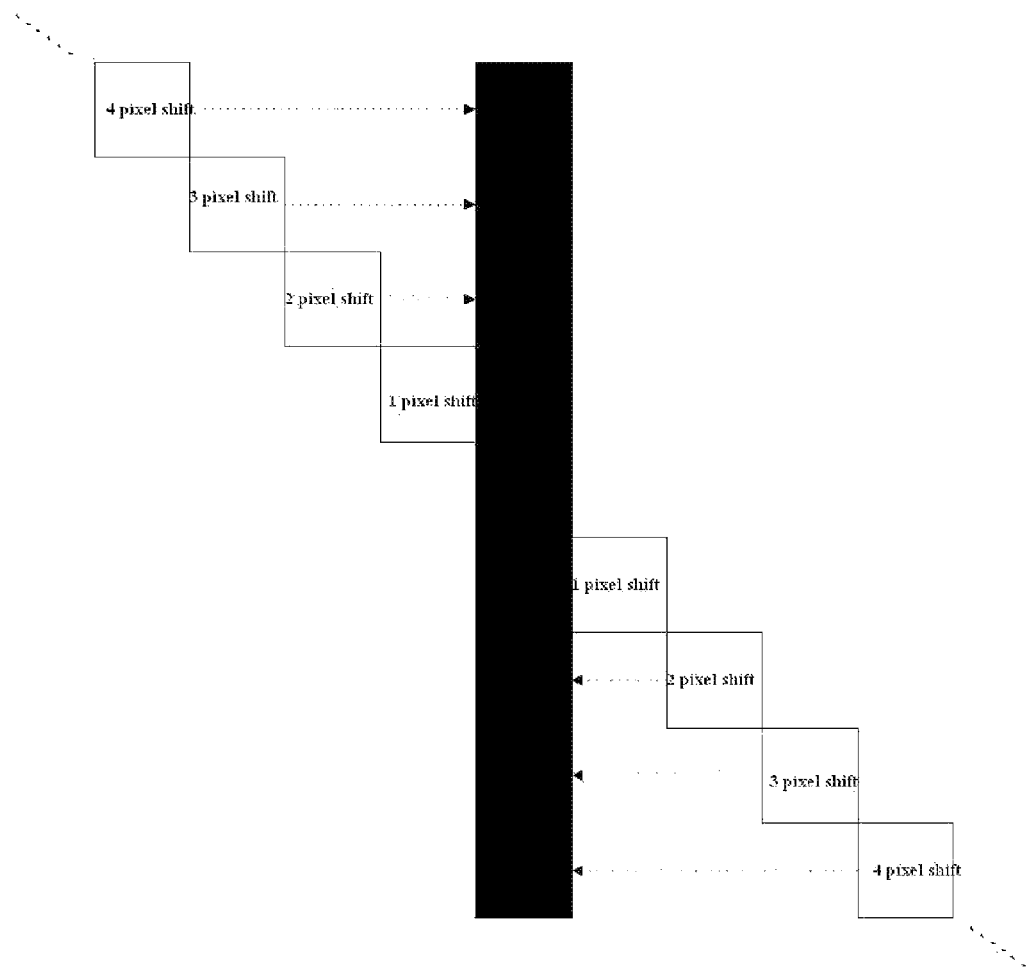

[FIG. 7]
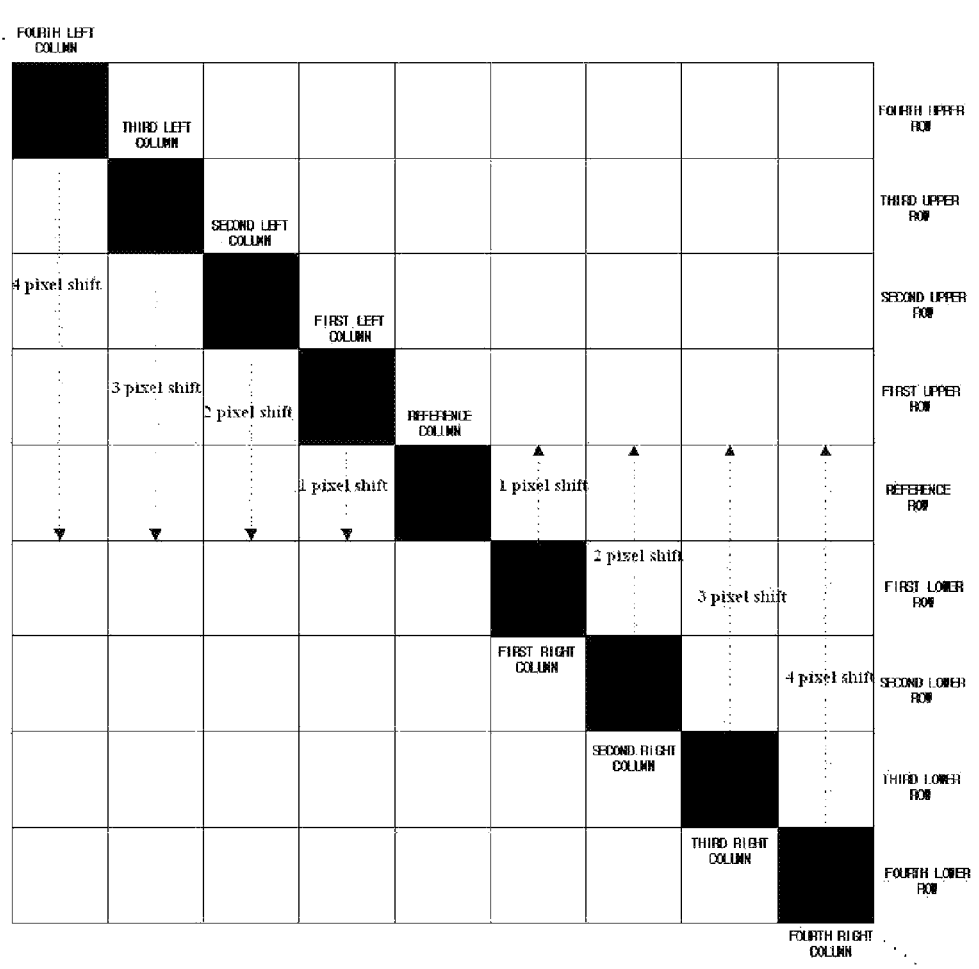

[FIG. 8]
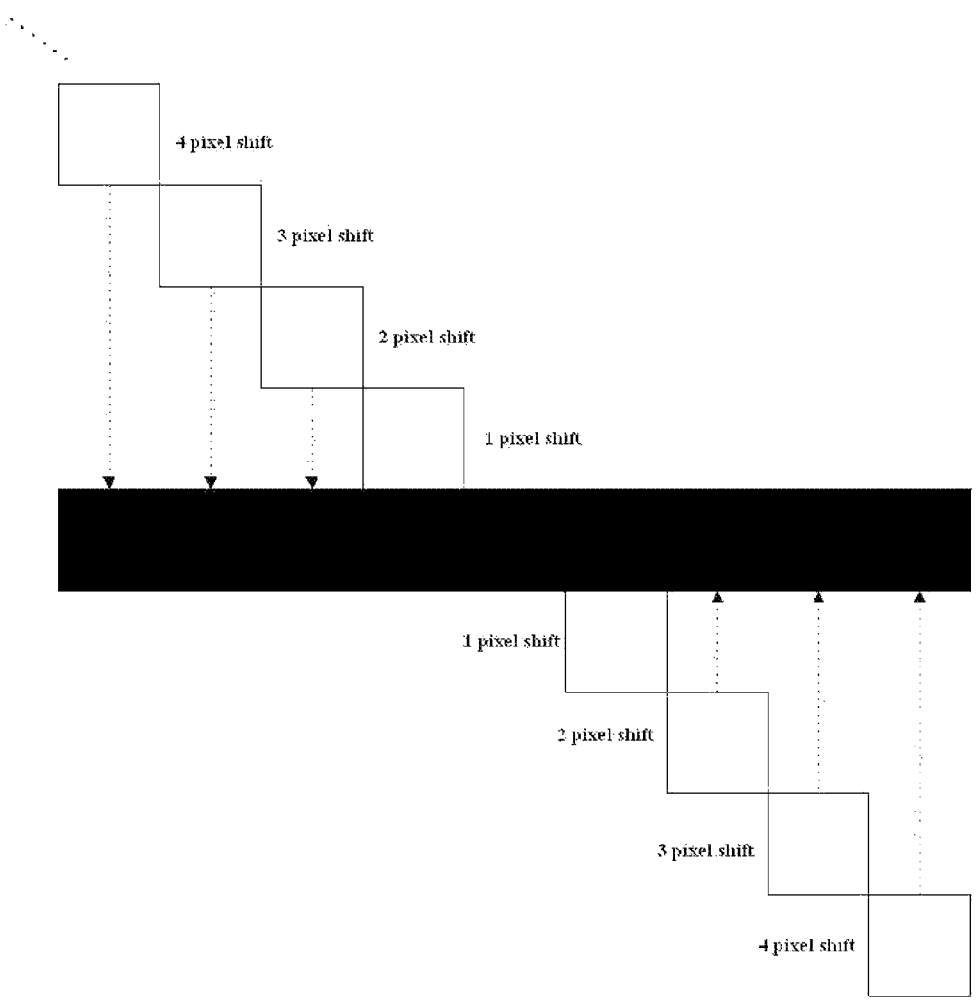

[FIG. 9]
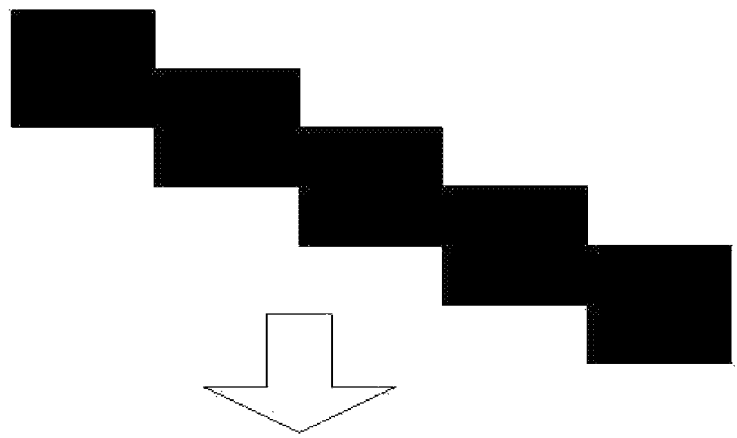
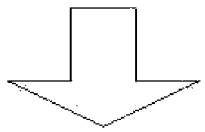
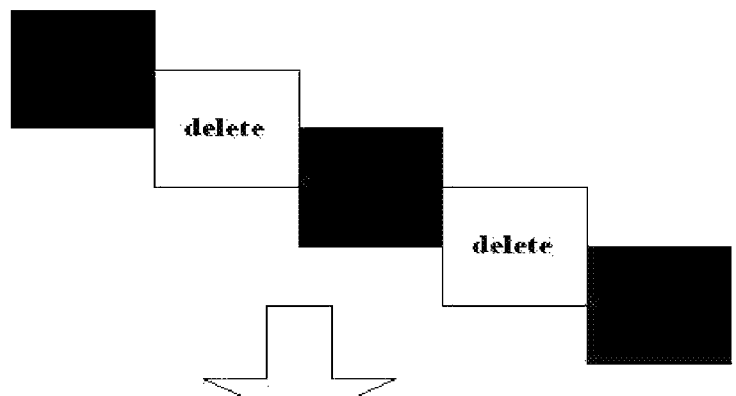
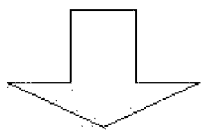

SYSTEM AND METHOD FOR DETECTING A REGION OF INTEREST ABOUT TILTED LINE

CROSS-REFERENCE TO RELATED APPLICATION

This application claims the priority to German Patent Application No. 102015207896.5, filed on Apr. 29, 2015, the disclosure of which is incorporated herein by reference in its entirety.

BACKGROUND OF THE INVENTION

Field of the Invention

Exemplary embodiments of the present invention relate to a system and a method for detecting a region of interest about a tilted line capable of detecting, as a region of interest (ROI), a portion where a tilted line is present in a front image acquired by a front looking camera equipped in a vehicle.

Description of the Related Art

Generally, a lane departure warning system (LDWS) is a system which detects a lane while a vehicle is driving to issue a warning when the vehicle is out of the lane.

A detection of a driving lane profoundly affects safe driving, and as a result, the accurate detection of the driving lane has been made by using various types of sensors which estimate and determine the position of the lane. That is, various sensors like an image sensor, a radar or lidar sensor, etc., have been used alone or in a fused form to detect a lane or recognize objects in front of a vehicle.

A vision based system using the image sensor may extract a lot of information at low cost and may use the existing various vision processing algorithms.

The vision based lane detection system detects a lane using an approximation method which extracts feature information from an input image, applies parameteric model matching for lane detection, and applies an update algorithm such as a Kalman filter or particle filtering, a method which applies non-parameteric model matching based on transform such as hough transform (HT), or the like.

Meanwhile, to increase performance of the lane detection and increase possibility of commercialization, there is a need to develop an algorithm which may adaptively cope with various road conditions or lane forms such as corresponding to various lane patterns like solid line and dashed-line lanes and a lane configured of direction indicators, corresponding to a change in colors of a lane like white (W), yellow (Y), blue (B), or red (R), or the like, corresponding to various road forms like a straight line lane, a curved lane, or the like, and corresponding to different road environment like a road structure, weather, a shade of a tree or lightness variation, incomplete pavement of a road.

A study on the lane detection against all the lane patterns or the road conditions of the actual road as described above has been currently progressed, and thus restrictive functions have reached commercialization.

However, there is a problem in that it is difficult to implement a real-time processing system due to a lot of computations and generality is limited due to physical limits of lane and road conditions.

Further, the existing lane detection method performs the lane detection on all the images without considering the condition in which the lane is limited, even though the area in which the lane is present is limited to a predetermined range in the image acquired by the fixed camera Therefore, the existing lane detection method has a problem in that it takes much time to process the image information.

RELATED ART DOCUMENT

Patent Document

Korean Patent Laid-Open Publication No. 10-2013-0128162 (Published on Nov. 26, 2013)

SUMMARY OF THE INVENTION

An object of the present invention provides a system and a method for detecting a region of interest about a tilted line capable of detecting, as a region of interest (ROI), a portion where a tilted line is present in a front image acquired by a front camera equipped in a vehicle.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

A system for detecting a region of interest about a tilted line includes: an image acquisition unit configured to acquire a front image by photographing a front of a vehicle; an image processing unit configured to divide the front image in a pixel unit of a row and a column and shift the front image by one pixel in a left or right direction in each row or in an upper or lower direction in each column until a region of interest (ROI) appears in a straight line in one direction; and a control unit configured to calculate coordinate values of the pixels forming the straight line in one direction to determine the tilted line of the region of interest, when the straight line in one direction appears in the region of interest as the shifted result.

The control unit may count a shift amount about how much the pixels in each row are shifted in the left or right direction in the pixel unit until upper and lower pixels forming the tilted line of the region of interest form a vertical line and perform an offset as much as the shift amount counted in each row on the vertical line to calculate the coordinate values of the pixels forming the tilted line so as to determine the tilted line of the region of interest.

The control unit may count a shift amount about how much the pixels in each column are shifted in the upper or lower direction in the pixel unit until left and right pixels forming the tilted line of the region of interest form a horizontal line and perform an offset as much as the shift amount counted in each column on the horizontal line to calculate the coordinate values of the pixels forming the tilted line so as to determine the tilted line of the region of interest.

The image processing unit may shift the front image by one pixel in the left or right direction in each row until the tilted line of the region of interest (ROI) appears in a vertical line.

The image processing unit may shift the front image by one pixel in the upper or lower direction in each column until the tilted line of the region of interest (ROI) appears in a horizontal line.

The image processing unit may perform ½ scaling on the pixels forming the region of interest (ROI) and shift the pixel one by one in the left or right direction in each row or the upper or lower direction in each column until the straight line in one direction appears in the region of interest (ROI).

The image processing unit may perform the ½ scaling on the pixels forming the region of interest (ROI) by a vector method and shift the pixel one by one in the left or right direction in each row or the upper or lower direction in each column until the straight line in one direction appears in the ½ scaled region of interest (ROI).

The image processing unit may perform the ½ scaling on the pixels forming the region of interest (ROI) by a method for deleting one pixel when left and right or upper and lower pixels which are adjacent to each other form a line having the same shape and shift the front image by one pixel in the left or right direction in each row or the upper or lower direction in each column until the straight line in one direction appears in the ½ scaled region of interest (ROI).

A method for detecting a region of interest about a tilted line includes: acquiring a front image by photographing a front of a vehicle; dividing the front image in a pixel unit of a row and a column; shifting the front image by one pixel in each row or each column until the region of interest (ROI) appears in a straight line in one direction; and calculating coordinate values of the pixels forming the straight line in one direction to determine the tilted line of the region of interest, when the straight line in one direction appears in the region of interest as the shifted result.

In the determining, the shift amount about how much the pixels in each row are shifted in the left or right direction may be counted in a pixel unit until upper and lower pixels forming the tilted line of the region of interest form a vertical line and an offset may be made on the vertical line as much as the shift amount counted in each row to calculate the coordinate values of the pixels forming the tilted line so as to determine the tilted line of the region of interest.

In the determining, the shift amount about how much the pixels in each column are shifted in the upper or lower direction may be counted in the pixel unit until left and right pixels forming the tilted line of the region of interest form the horizontal line and the offset may be made on the horizontal line as much as the shift amount counted in each column to calculate the coordinate values of the pixels forming the tilted line so as to determine the tilted line of the region of interest.

In the shifting, the front image may be shifted by one pixel in the left or right direction in each row until the tilted line of the region of interest (ROI) appears in the vertical line.

In the shifting, the front image may be shifted by one pixel in the upper or lower direction in each column until the tilted line of the region of interest (ROI) appears in a horizontal line.

In the shifting, ½ scaling may be performed on the pixels forming the region of interest (ROI) and the pixels may be shifted one by one in the left or right direction in each row or the upper or lower direction in each column until the straight line in one direction appears in the region of interest (ROI).

In the shifting, the ½ scaling may be performed on the pixels forming the region of interest (ROI) by a vector method and the pixels may be shifted one by one in the left or right direction in each row or the upper or lower direction in each column until the straight line in one direction appears in the ½ scaled region of interest (ROI).

In the shifting, the ½ scaling may be performed on the pixels forming the region of interest (ROI) by a method for deleting one pixel when left and right or upper and lower pixels which are adjacent to each other form a line having the same shape and the pixels may be shifted one by one in the left or right direction in each row or the upper or lower direction in each column until the straight line in one direction appears in the ½ scaled region of interest (ROI).

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which:

FIG. 1 shows a block diagram schematically illustrating main components of a system for detecting a region of interest about a tilted line according to an exemplary embodiment of the present invention;

FIG. 2 shows an operation flow chart for describing a method for detecting a region of interest about a tilted line according to an exemplary embodiment of the present invention;

FIG. 3 shows a diagram illustrating an example in which the tilted line is included in a front image acquired according to the exemplary embodiment of the present invention;

FIG. 4 shows a diagram illustrating an example in which the front image according to the exemplary embodiment of the present invention is divided into a row and a column in a pixel unit;

FIG. 5 shows a diagram illustrating an example in which a pixel forming the tilted line of the region of interest according to the exemplary embodiment of the present invention is shifted one by one in a left or right direction;

FIG. 6 shows a diagram illustrating an example in which a vertical line appears by shifting the pixel one by one in the left or right direction, according to the exemplary embodiment of the present invention;

FIG. 7 shows a diagram illustrating an example in which the pixel forming the tilted line of the region of interest according to the exemplary embodiment of the present invention is shifted one by one in an upper or lower direction;

FIG. 8 shows a diagram illustrating an example in which a horizontal line appears by shifting the pixel one by one in the upper or lower direction, according to the exemplary embodiment of the present invention; and FIG. 9 shows a diagram illustrating an example in which the pixels forming the tilted line according to the exemplary embodiment of the present invention are ½ scaled by deleting one pixel from adjacent pixels.

DESCRIPTION OF SPECIFIC EMBODIMENTS

Hereinafter, exemplary embodiments of the present invention will be described in detail with reference to the accompanying drawings so that those skilled in the art may easily practice the present invention. As those skilled in the art would realize, the described embodiments may be modified in various different ways, all without departing from the spirit or scope of the present invention.

A part irrelevant to the description will be omitted to clearly describe the present invention, and the same elements will be designated by the same reference numerals throughout the specification.

In addition, throughout the present specification, when any one part is referred to as being "connected to" another part, it means that any one part and another part are "directly connected to" each other or are "electrically connected to" each other with the other part interposed therebetween. In addition, unless explicitly described to the contrary, "comprising" any components will be understood to imply the inclusion of other elements rather than the exclusion of any other elements.

The mention that any portion is present "over" another portion means that any portion may be directly formed on another portion or a third portion may be interposed between one portion and another portion. In contrast, the mention that any portion is present "just over" another portion means that a third portion may not be interposed between one portion and another portion.

Terms used throughout the specification, 'first', 'second', 'third', etc. can be used to describe various portions, components, regions, layers, and/or sections but are not limited thereto. These terms are used only to differentiate any portion, component, region, layer, or section from other portions, components, regions, layers, or sections. Therefore, a first portion, component, region, layer, or section which will be described below may be mentioned as a second portion, component, region, layer, or section without departing from the scope of the present invention.

Terminologies used herein are to mention only a specific exemplary embodiment, and does not limit the present invention. Singular forms used herein include plural forms as long as phrases do not clearly indicate an opposite meaning. A term "including" used in the present specification concretely indicates specific properties, regions, integer numbers, steps, operations, elements, and/or components, and is not to exclude presence or addition of other specific properties, regions, integer numbers, steps, operations, elements, components, and/or a group thereof.

The term expressing the relative space of "under", "over", and the like may be used to more easily describe the relationship between other portions of one portion which is illustrated in the drawings. The terms intend to include other meanings or operations of apparatuses which are being used along with the intended meaning in the drawings. For example, overturning the apparatus in the drawings, any portions described as being positioned "under" other portions will be described as being postioned "over" other portions. Therefore, the exemplified term "under" includes both of the up and down directions. An apparatus may rotate by 90### or may rotate at different angles and the term expressing a relative space is interpreted accordingly.

All terms including technical terms and scientific terms used herein have the same meaning as the meaning generally understood by those skilled in the art to which the present invention pertains unless defined otherwise. Terms defined in a generally used dictionary are additionally interpreted as having the meaning matched to the related art document and the currently disclosed contents and are not interpreted as ideal or formal meaning unless defined.

Hereinafter, exemplary embodiments of the present invention so as to be easily practiced by a person skilled in the art to which the present invention pertains will be described in detail with reference to the accompanying drawings. However, the present invention may be modified in various different ways and is not limited to the embodiments provided in the present description.

FIG. 1 is a block diagram schematically illustrating main components of a system for detecting a region of interest about a tilted line according to an exemplary embodiment of the present invention.

Referring to FIG. 1, the system for detecting a region of interest about a tilted line according to the exemplary embodiment of the present invention includes an image acquisition unit 110, an image processing unit 120, and a control unit 130.

In addition, the system for detecting a region of interest about a tilted line may further include a storage unit 140 and an output unit 150.

The image acquisition unit 110 photographs a front of a vehicle using a camera to acquire a front image. The image acquisition unit 110 photographs the front of the vehicle to acquire the front image including a lane in an image form or a moving picture form.

The image processing unit 120 divides the front image in a pixel unit of a row and a column and shifts the front image by one pixel in a left or right direction in each row or in an upper or lower direction in each column until the region of interest (ROI) appears in a straight line (vertical line or horizontal line) in one direction.

The image processing unit 120 shifts the front image by one pixel in the left or right direction in each row until the tilted line of the region of interest (ROI) appears in the vertical line.

The image processing unit 120 shifts the front image by one pixel in the upper or lower direction in each column until the tilted line of the region of interest (ROI) appears in the horizontal line.

The image processing unit 120 performs ½ scaling on pixels forming the region of interest (ROI) and shifts the front image by one pixel in the left or right direction in each row or the upper or lower direction in each column until a straight line in one direction appears in the region of interest (ROI).

The image processing unit 120 performs the ½ scaling on the pixels forming the region of interest (ROI) by a vector method and shifts the front image by one pixel in the left or right direction in each row or the upper or lower direction in each column until a straight line in one direction appears in the ½ scaled region of interest (ROI).

The image processing unit 120 performs the ½ scaling on the pixels forming the region of interest (ROI) by a method for deleting one pixel when left and right or upper and lower pixels which are adjacent to each other form a line having the same shape and shifts the front image by one pixel in the left or right direction in each row or the upper or lower direction in each column until the straight line in one direction appears in the ½ scaled region of interest (ROI).

When the straight line in one direction appears in the region of interest as the shifted result, the control unit 130 calculates coordinate values of the pixels forming the straight line in one direction to determine the tilted line of the region of interest.

The control unit 130 counts a shift amount about how much the pixels in each row are shifted in the left or right direction in a pixel unit until the upper and lower pixels forming the tilted line of the region of interest form the vertical line and performs an offset as much as the shift amount counted in each row on the vertical line to calculate the coordinate values of the pixels forming the tilted line so as to determine the tilted line of the region of interest.

The control unit 130 counts a shift amount about how much the pixels in each column are shifted in the upper or lower direction in a pixel unit until the left and right pixels forming the tilted line of the region of interest form the horizontal line and performs an offset as much as the shift amount counted in each column on the horizontal line to calculate the coordinate values of the pixels forming the tilted line so as to determine the tilted line of the region of interest.

The storage unit 140 stores the front image acquired by photographing the front of the vehicle using the camera or stores the front image shifted by one pixel in the left or right direction in each row or the upper or lower direction in each column until the region of interest (ROI) appears in the vertical line or the horizontal line.

The output unit 150 outputs the front image acquired by photographing the front of the vehicle using the camera on a screen or outputs the front image shifted by one pixel in the left or right direction in each row or the upper or lower direction in each column on the screen.

FIG. 2 is an operation flow chart for describing a method for detecting a region of interest about a tilted line according to an exemplary embodiment of the present invention.

Referring to FIG. 2, the system 100 for detecting a region of interest about a tilted line according to the exemplary embodiment of the present invention first acquires the front image by photographing the front of the vehicle in the image acquisition unit 110 (S210).

For example, as illustrated in FIG. 3, the front image in which the tilted line (tilted line A) is included may be acquired. FIG. 3 is a diagram illustrating an example in which the tilted line is included in the front image acquired according to the exemplary embodiment of the present invention.

Next, the image processing unit 120 divides the front image in the pixel unit of the row and column (S220).

That is, as illustrated in FIG. 4, the image processing unit 120 divides the front image including the tilted line in the pixel unit of the row and column. FIG. 4 is a diagram illustrating an example in which the front image according to the exemplary embodiment of the present invention is divided into the row and the column in the pixel unit.

Next, as illustrated in FIG. 5, the image processing unit 120 shifts the front image by one pixel in each row or each column until the region of interest (ROI) appears in the straight line in one direction (S230).

That is, the image processing unit 120 shifts the front image by one pixel in the left or right direction in each row as illustrated in FIG. 5 until the pixel forming the tilted line of the region of interest (ROI) appears in the straight line, for example, in the vertical line as illustrated in FIG. 6. FIG. 5 is a diagram illustrating an example in which the pixel forming the tilted line of the region of interest according to the exemplary embodiment of the present invention is shifted one by one in a left or right direction and FIG. 6 is a diagram illustrating an example in which the vertical line appears by shifting the pixel one by one in the left or right direction, according to the exemplary embodiment of the present invention. As illustrated in FIG. 5, left and right pixels are shifted by one pixel, two pixels, . . . , N−1 pixels, and N pixels based on a central pixel among the pixels forming the tilted line of the region of interest. Therefore, the left and right pixels are shifted by one pixel, one pixel, two pixels, . . . , N−1 pixels, and N pixels based the central pixel in each row and thus form a vertical line as illustrated in FIG. 6.

Further, the image processing unit 120 shifts the pixel one by one in the upper or lower direction in each column until the tilted line of the region of interest (ROI) appears in, for example, the horizontal line as illustrated in FIG. 7. FIG. 7 is a diagram illustrating an example in which the pixel forming the tilted line of the region of interest according to the exemplary embodiment of the present invention is shifted one by one in the upper or lower direction and FIG. 8 is a diagram illustrating an example in which the horizontal line appears by shifting the pixel one by one in the upper or lower direction, according to the exemplary embodiment of the present invention. As illustrated in FIG. 7, upper and lower pixels are shifted by one pixel, two pixels, . . . , N−1 pixels, and N pixels based on a central pixel among the pixels forming the tilted line of the region of interest. Therefore, the upper and lower pixels are shifted by one pixel, one pixel, two pixels, . . . , N−1 pixels, and N pixels based the central pixel in each column and thus form the horizontal line as illustrated in FIG. 8.

Further, the image processing unit 120 performs the ½ scaling on the pixels forming the region of interest (ROI) and shifts the pixel one by one in the left or right direction in each row or the upper or lower direction in each column until the straight line in one direction appears in the region of interest (ROI). The image processing unit 120 performs the ½ scaling on the pixels forming the region of interest (ROI) by the vector method and shifts the pixel one by one in the left or right direction in each row or the upper or lower direction in each column until the straight line in one direction appears in the ½ scaled region of interest (ROI).

Further, the image processing unit 120 performs the ½ scaling on the pixels forming the tilted line of the region of interest (ROI) by a method for deleting one pixel from adjacent pixels as illustrated in FIG. 9 when left and right or upper and lower pixels which are adjacent to each other form a line having the same shape. FIG. 9 is a diagram illustrating an example in which the pixels forming the tilted line according to the exemplary embodiment of the present invention are ½ scaled by deleting one pixel from adjacent pixels. As illustrated in FIG. 9, the image processing unit 120 performing the ½ scaling by the method for deleting one pixel from the adjacent pixels shifts the pixel one by one in the left or right direction in each row or in the upper or lower direction in each column until the vertical line illustrated in FIG. 6 or the horizontal line illustrated in FIG. 8 appears in the ½ scaled region of interest (ROI).

Meanwhile, when the straight line in one direction appears in the region of interest as the shifted result by the image processing unit 120 (S240: Yes), the control unit 130 calculates the coordinate values of the pixels forming the straight line in one direction to determine the tilted line of the region of interest (S250).

For example, the control unit 130 counts the shift amount about how much the pixels in each row are shifted in the left or right direction in the pixel unit until the upper and lower pixels forming the tilted line of the region of interest form the vertical line as illustrated in FIG. 5 and performs the offset as much as the shift amount counted in each row on the vertical line illustrated in FIG. 6 to calculate the coordinate values of the pixels forming the tilted line so as to determine the tilted line of the region of interest. In FIG. 5, in connection with the shift amount shifted in the left or right direction, a first left column of a first upper row is shifted by one pixel, a second left column of a second upper row is shifted by two pixels, a third left column of a third upper row is shifted by three pixels, a fourth left column of a fourth upper row is shifted by four pixels, a first right column of a first lower row is shifted by one pixel, a second right column of a second lower row is shifted by two pixels, a third right column of a third lower row is shifted by three pixels, and a fourth right column of a fourth lower row is shifted by four pixels. Therefore, calculating the shift amount from the vertical line of FIG. 6 in each row, the control unit 130 may obtain, as the pixel forming the tilted line of the region of interest (ROI), each pixel having coordinates of the first upper row and the first left column, the second upper row and the second left column, the third upper row and the third left column, and the fourth upper row and the fourth left column based on a reference row and a reference column.

Further, the control unit 130 counts the shift amount about how much the pixels in each column are shifted in the upper or lower direction in the pixel unit until the left and right pixels forming the tilted line of the region of interest form the horizontal line as illustrated in FIG. 7 and performs the offset as much as the shift amount counted in each column on the horizontal line illustrated in FIG. 8 to calculate the coordinate values of the pixels forming the tilted line so as to determine the tilted line of the region of interest. In FIG. 7, in connection with each of the shift amounts shifted in the upper or lower direction, a first upper row of a first left column is shifted by one pixel, a second upper row of a second left column is shifted by two pixels, a third upper row of a third left column is shifted by three pixels, a fourth upper row of a fourth left column is shifted by four pixels, a first lower row of a first right column is shifted by one pixel, a second lower row of a second right column is shifted by two pixels, a third lower row of a third right column is shifted by three pixels, and a fourth lower row of a fourth right column is shifted by four pixels. Therefore, calculating the shift amount from the horizontal line of FIG. 8 in each column, the controller 130 may obtain, as the pixel forming the tilted line of the region of interest (ROI), each pixel having coordinates of the first left column and the first upper row, the second left column and the second upper row, the third left column and the third upper row, the fourth left column and the fourth upper row, the first right column and the first lower row, the second right column and the second lower row, the third right column and the third lower row, and the fourth right column and the fourth lower row based on the reference column and the reference row.

As described above, the exemplary embodiment of the present invention may realize the system and method for detecting a region of interest about a tilted line capable of detecting, as the region of interest (ROI), the portion where the tilted line is present in the front image acquired by the front camera equipped in the vehicle.

According to the exemplary embodiments of the present invention, when the tilted line appears by photographing the front of the vehicle while the vehicle is driving, the image processing is performed to form the vertical line or the horizontal line by shifting the front image in each row or each column in the pixel unit, it is possible to find out the region of interest having the tilted line quickly.

Further, it is possible to solve the problem in that it takes much time to process the image information by detecting the region of interest having the tilted line in the front image quickly.

Although the present invention was described above with reference to exemplary embodiments, it should be understood that the present invention may be changed and modified in various ways by those skilled in the art, without departing from the spirit and scope of the present invention described in claims.

What is claimed is:

1. A system for detecting a region of interest about a tilted line, comprising:
    an image acquisition unit acquiring a front image by photographing a front of a vehicle;
    an image processor dividing the front image in a pixel unit of a row and a column and shifting the front image by one pixel in a left or right direction in each row or in an upper or lower direction in each column until a region of interest (ROI) appears in a straight line in one direction; and
    a controller calculating coordinate values of the pixels forming the straight line in one direction to determine the tilted line of the region of interest, when the straight line in one direction appears in the region of interest as the shifted result.

2. The system of claim 1, wherein the controller counts a shift amount about how much the pixels in each row are shifted in the left or right direction in the pixel unit until upper and lower pixels forming the tilted line of the region of interest form a vertical line and performs an offset as much as the shift amount counted in each row on the vertical line to calculate the coordinate values of the pixels forming the tilted line so as to determine the tilted line of the region of interest.

3. The system of claim 1, wherein the controller counts a shift amount about how much the pixels in each column are shifted in the upper or lower direction in the pixel unit until left and right pixels forming the tilted line of the region of interest form a horizontal line and performs an offset as much as the shift amount counted in each column on the horizontal line to calculate the coordinate values of the pixels forming the tilted line so as to determine the tilted line of the region of interest.

4. The system of claim 1, wherein the image processor shifts the front image by one pixel in the left or right direction in each row until the tilted line of the region of interest (ROI) appears in a vertical line.

5. The system of claim 1, wherein the image processor shifts the front image by one pixel in the upper or lower direction in each column until the tilted line of the region of interest (ROI) appears in a horizontal line.

6. The system of claim 1, wherein the image processor performs ½ scaling on the pixels forming the region of interest (ROI) and shifts the pixels one by one in the left or right direction in each row or the upper or lower direction in each column until the straight line in one direction appears in the region of interest (ROI).

7. The system of claim 1, wherein the image processor performs the ½ scaling on the pixels forming the region of interest (ROI) by a vector method and shifts the pixels one by one in the left or right direction in each row or the upper or lower direction in each column until the straight line in one direction appears in the ½ scaled region of interest (ROI).

8. The system of claim 1, wherein the image processor performs the ½ scaling on the pixels forming the region of interest (ROI) by a method for deleting one pixel when left and right or upper and lower pixels which are adjacent to each other form a line having the same shape and shifts the pixels by one pixel in the left or right direction in each row or the upper or lower direction in each column until the straight line in one direction appears in the ½ scaled region of interest (ROI).

9. A method for detecting a region of interest about a tilted line, comprising:
    acquiring a front image by photographing a front of a vehicle;
    dividing the front image in a pixel unit of a row and a column;
    shifting the front image by one pixel in each row or each column until the region of interest (ROI) appears in a straight line in one direction; and
    calculating coordinate values of the pixels forming the straight line in one direction to determine the tilted line of the region of interest, when the straight line in one direction appears in the region of interest as the shifted result.

\* \* \* \* \*